Aug. 4, 1970   E. J. FAY ET AL   3,522,409
SELECTABLE MODE WELDING APPARATUS
Filed Aug. 21, 1967   4 Sheets-Sheet 1

United States Patent Office 3,522,409
Patented Aug. 4, 1970

3,522,409
SELECTABLE MODE WELDING APPARATUS
Elliott J. Fay, Willingboro, and Francis J. Preston, Cinaminson, N.J., assignors to Omark Industries, Inc., Portland, Oreg., a corporation of Oregon
Filed Aug. 21, 1967, Ser. No. 661,932
Int. Cl. B23k 9/20
U.S. Cl. 219—98
18 Claims

ABSTRACT OF THE DISCLOSURE

Welding apparatus selectively operable in either the drawn arc, initial gap, or initial contact modes of operation employing two power sources of different voltages in which the power source of higher voltage provides the source of welding energy and is connected in circuit with the gun solenoid for operation thereof when in the drawn arc mode of operation but in which the lower voltage power source is connected in circuit with the gun solenoid to hold the stud in lifted position when in the initial gap mode of operation and in which both the higher and lower voltage power sources are disconnected from the gun solenoid when in the initial contact mode of operation.

The main control circuit is actuated through a manually operable switch in circuit with the main welding circuit and alternate parallel paths including the stud and workpiece and a portion of the welding gun and workpiece together with isolating diodes for isolating the control circuit and the welding gun from the main welding energy circuit.

BACKGROUND OF INVENTION

Welding processes and especially stud welding processes may be physically divided into three categories, i.e., the drawn arc mode of operation, the initial gap mode and the initial contact mode. This basic classification of welding process is generally used where the power source is by means of a previously charged capacitor which is known as capacitor discharge welding.

The drawn arc mode of welding is a welding process in which the stud to be welded is initially held in contact with a workpiece at the initiation of the weld cycle. Simultaneously, the stud is withdrawn a discrete distance from the workpiece to strike what is known as a pilot arc. This pilot arc is of a low current intensity and tends to roughen the surfaces of the stud and workpiece as well as to create an ionized path upon which a higher current intensity welding arc may be superimposed. After the pilot arc has been maintained a predetermined time, the high current intensity welding arc is then superimposed across the ionized path established by the pilot arc. In timed relationship with the establishment of the welding arc, the stud is plunged toward the workpiece and the molten contiguous portions of the stud and workpiece are united in a weld.

Due to the effects of the pilot arc, the studs normally used in the drawn arc welding process may, in some applications dispense with the welding tip on the end of the stud which are generally used for initiation of the welding process in the initial gap and initial contact modes as discussed hereinafter.

The initial gap mode of operation does not utilize a pilot arc as in the case of the drawn arc mode of operation but utilizes a stud which has a small projection on the end thereof. The stud is initially retracted from the workpiece before the weld cycle is initiated. Upon initiation of the weld cycle, the stud is released and plunges toward the workpiece and at a predetermined time with respect to the release of the stud, the main welding contactor closes and connects the stud in circuit with the source of welding energy. The discharge of the welding current will occur upon contact of the welding tip of the stud with the workpiece. Upon the discharge of the high intensity welding current, the welding tip explodes or disintegrates and heating of the contiguous portions of the stud and workpiece continues through welding temperature with resultant diffusion and bonding of the portions together under the applied pressure.

In the initial contact mode of operation, the same type of welding stud is used, but instead, the stud is spring biased into engagement with the workpiece rather than plunged into engagement therewith. The main welding current is discharged through the welding tip of the stud and, as in the case of the initial gap mode, causes disintegration of the projection and initiates heating of the contiguous portions of the stud and workpiece to welding temperature whereupon the stud and workpiece are united.

Each of these three modes of operation, i.e., drawn arc, initial gap and initial contact, has its particular advantages in a specific welding application. For example, the drawn arc mode may utilize tipless studs and be used under conditions in which the surface of the workpiece is less than perfect. In the case of the initial gap mode, less reverse side marking on thin base materials is experienced as well as a distinct reduction of spatter. The advantages of the contact mode of operation are to be found in its universal application and inherent simplicity.

Apparatus which is capable of combining these three modes of operation into one welding machine has long been sought after by the industry and, until now, has been unavailable.

SUMMARY OF INVENTION

The present invention provides welding apparatus which can selectively operate in either the drawn arc, initial gap, or initial contact modes of operation in an efficient and practical manner. The circuitry employed may, in a given embodiment, utilize two power sources, one of which is of a higher voltage level than the other. When the apparatus is selectively placed in the drawn arc mode, the higher voltage source selectively energizes and de-energizes the gun solenoid to retract and release the stud in predetermined relationship to the initiation of the pilot arc and welding arc.

When the circuitry is selectively placed in the initial gap mode of operation, the lower voltage power source energizes the gun solenoid coil only sufficiently to hold the stud when manually placed in retracted position. Upon the initiation of the welding cycle, the gun solenoid is de-energized and the stud is returned to the workpiece in predetermined relationship to the initiation of the main welding arc.

When the circuitry of the present invention is selectively placed in the initial contact mode, both power sources are disconnected from the gun solenoid circuit, and the stud is not withdrawn from the workpiece at any point in the weld cycle.

The control circuitry employed in effecting the various modes of operation includes a switching network operating to disconnect either or both power sources from the gun solenoid to determine the mode of operation in which the apparatus will function.

Working in conjunction with the switching network is a first relay actuated upon initiation of the welding cycle which places the higher voltage source in circuit with the gun solenoid to actuate the solenoid when the switching network is in the drawn arc mode of operation. When the switching network is in the initial gap mode of operation, this same relay operates to disconnect the lower voltage source from the gun solenoid to de-energize the solenoid.

A second relay, which is controlled by actuation of the first relay, also operates whenever the apparatus is in the drawn arc mode to disconnect the higher voltage source from the gun solenoid after a predetermined time to return the stud to the workpiece.

Whenever the switching network is in the initial contact mode, neither relay is effective since both power sources are out of circuit with the gun solenoid.

The main control relay in the control circuit for the welding apparatus is energized by the second and lower voltage power source by completion of a circuit through a manually operated trigger in the gun, a portion of the main welding arc conductor and a parallel circuit across either the stud and workpiece or leg of the welding gun and workpiece.

Isolation diodes are used between the control circuit and the main welding arc circuit to isolate the control circuit and the leg of the welding gun from the high energy discharge through the main welding circuit.

OBJECTS OF THE INVENTION

It is an object of the present invention to provide welding apparatus which may be selectively operated in the drawn arc, initial gap and initial contact mode which utilizes a solenoid for positionng a stud with respect to the workpiece, a power source, first circuit means connected to the power source for applying a first voltage across the solenoid of value sufficient to cause retraction of the stud, second circuit means connected to the power source for applying a voltage across the solenoid of value insufficient to cause retraction of the stud but of value sufficient to hold the stud when manually retracted, first switching means for selectively opening either or both the first or second means, second switching means actuated upon initiation of the welding cycle for simultaneously closing the first circuit means and opening the second circuit means and third switching means controlled by actuation of the second switching means for opening the first circuit means after initiation of the welding cycle.

In selected instances in accordance with the present invention, the power source utilized may include a first and a second power source in which the first power source supplies the main welding energy and is of a higher voltage than the second power source.

A further object of the present invention is to provide a control circuit for welding apparatus in which the main control means is energized through a circuit which includes a portion of the main welding arc circuit and alternate and parallel circuits including either the stud and workpiece or leg of the welding gun and workpiece respectively.

Other objects and advantages of the present invention will become apparent from a consideration of the detailed description thereof and the drawings.

DESCRIPTION OF INVENTION

(A) In general

Figure 1:
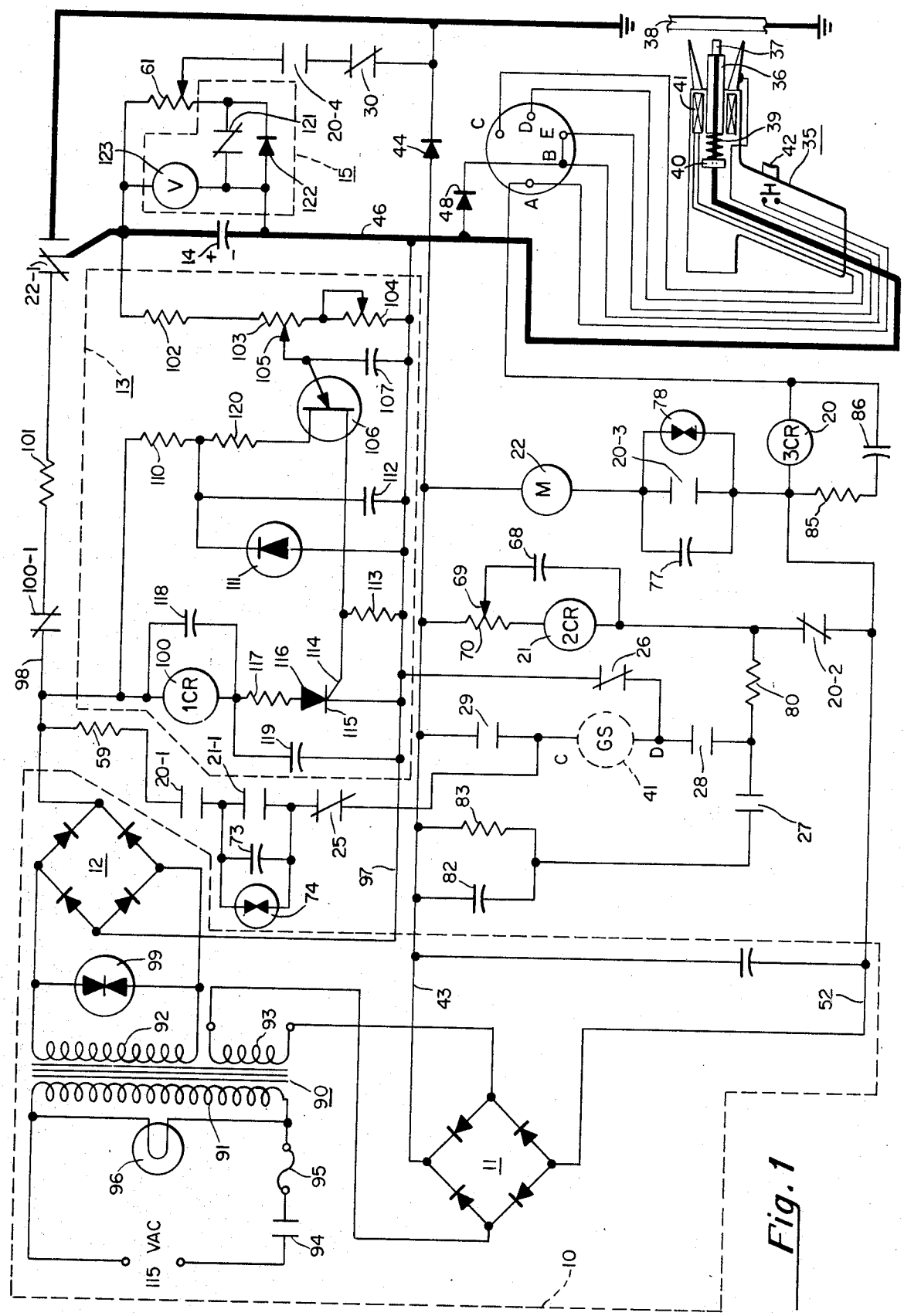
FIG. 1 is a detailed wiring schematic of the circuit of the present invention.

Referring to FIG. 1, the welding apparatus of the present invention employs a power supply 10 shown enclosed by broken lines. It will suffice at this time to note only that this power supply utilizes two bridge rectifiers 11 and 12 which provide the system with two independent power supplies.

The system also includes a charging circuit 13 shown enclosed by dotted lines which maintains a predetermined charge on the welding capacitor 14 and, as well, a safety circuit 15 likewise enclosed in dotted lines. The power supply, charging circuit and safety circuit will be discussed in more detail hereinafter.

The welding gun 35 which is used with the present invention, includes a stud holding member or chuck 36 which retains the stud 37 which is to be welded to the workpiece 38. The chuck 36 is biased into an extended position by means of a spring 39 which is backed by a stop member 40.

A solenoid member 41 is provided which, depending on its level of energization, will hold the chuck 36 in retracted position after being manually retracted or function to retract the chuck as well if sufficiently energized, as will be discussed in more detail hereinafter. A welding gun of the nature contemplated for use by the invention may be of the type shown in Kelemen et al. Pat. No. 2,796,513 issued June 18, 1957.

The selection of the mode of operation of the welding apparatus and the control of the apparatus during the welding process, is effected by means of switches 25–30 and relays 20, 21 and 22 together with their respective contacts 20–1 through 20–4, 21–1 and 22–1 respectively.

The particular position of a given switch and the effect on the circuit operation of a given relay contact, will differ depending on the mode of operation in which the circuitry is selectively operating. The particular positions of the respective switches and effects of the relays can best be seen in FIGS. 2–4 in which the switch positions are shown for each mode of operation together with the control linkages between the respective relays and their contacts.

(B) The drawn arc mode

Figure 2:
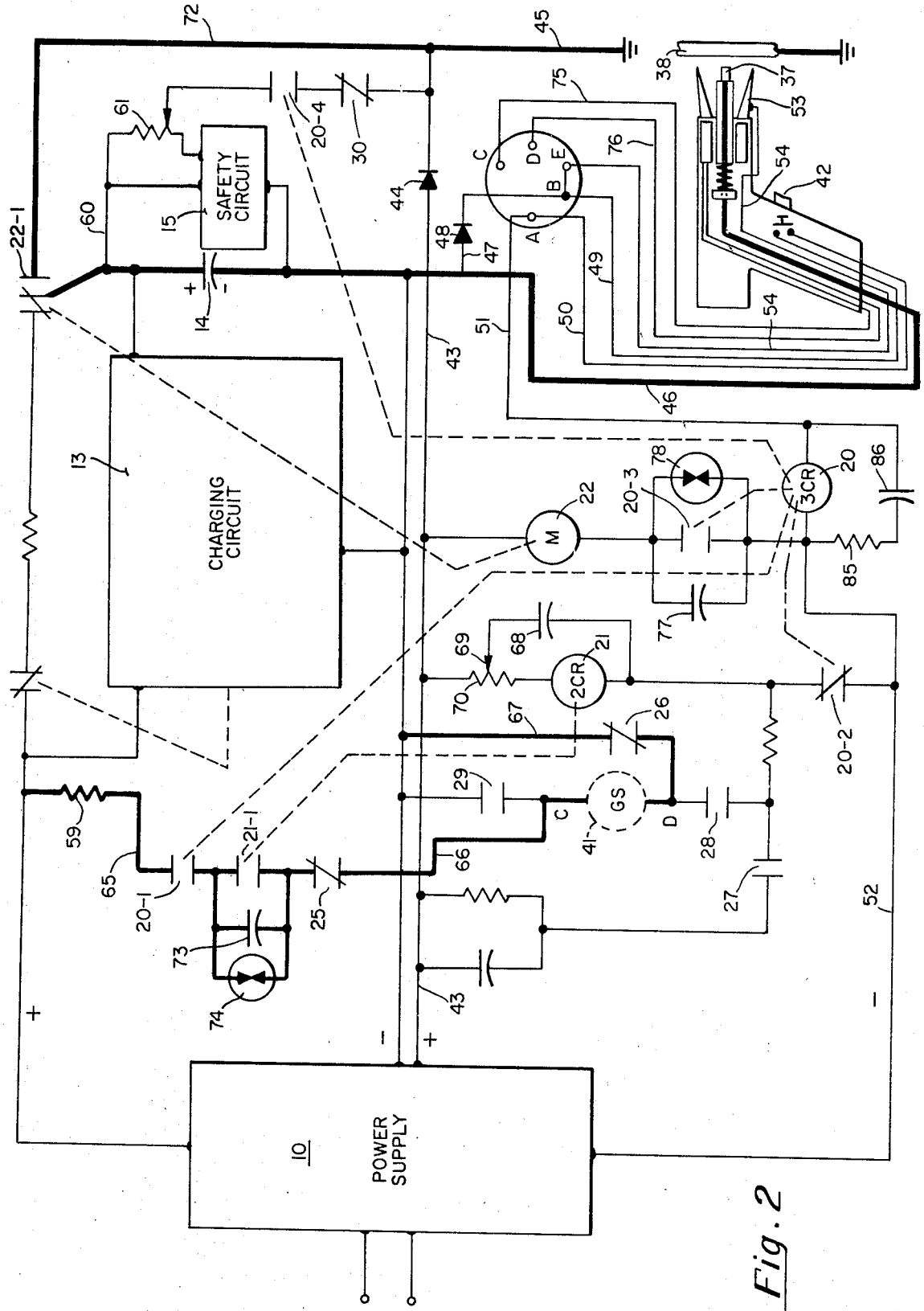
FIG. 2 is a wiring schematic of the present invention showing the circuitry selectively placed in the drawn arc mode.

FIG. 2 illustrates the relative positions of switches 25–30 when the apparatus is selectively placed in the drawn arc mode. As can be seen in FIG. 2, switches 25, 26 and 30 are closed and switches 27, 28 and 29 opened.

Closing of switches 25 and 26 places the gun solenoid 41 in circuit with the first power supply which includes rectifier 12 as shown in FIG. 1. As earlier stated, the first power supply is of a higher voltage than the second power supply derived from the rectifier 11.

The welding cycle in the drawn arc mode is initiated upon operation of control relay 20 which will be energized upon completion of a circuit between the relay and the second power source. The completed circuit from the second power source includes conductor 43 and isolation diode 44 and thence by way of a portion 45 of the main welding arc circuit to the workpiece 38. At this point, the circuit is completed by two alternate paths, the first being through stud 37, a second portion 46 of the main welding arc circuit, conductor 47 and isolation diode 48 to terminal B of the welding cable connector. The circuit is then completed by way of conductor 49, gun trigger 42 and thence by way of conductors 50 and 51 through control relay 20 to the opposite side of the power supply through conductor 52.

The alternate current path for completing the circuit through the relay 20 is by way of the workpiece 38 through a leg 53 of the welding gun, and conductor 54 to terminal B whereupon the completion of the circuit is as in the case of triggering through the stud.

This triggering arrangement allows for initiation of the welding cycle whenever either the leg of the gun or stud is in contact with the workpiece and the gun trigger is closed. The resultant energization of relay 20 will simultaneously close relay contacts 20–1, 20–3 and 20–4 and open contacts 20–2.

In the operational sequence that follows energization of relay 20, the first effect is upon the closing of relay contacts 20–4. This establishes a pilot arc across the stud and workpiece through a circuit extending from the positive side of the welding capacitor 14 by way of conductor 60, resistor 61, relay contacts 20–4, closed switch 30 and the main welding conductor 45 to the workpiece 38. The return current path includes the stud 37, and conductor 46. The pilot arc will be of low intensity due to the resistance of resistor 61.

Prior to the initiation of the welding cycle, relay 21 was energized and contacts 21–1 closed inasmuch as relay contacts 20–2 are normally closed thus placing the relay 21 in circuit with the second power source.

Simultaneously with initiation of the pilot arc upon the closing of contacts 20–4, relay contacts 20–1 also close, thus completing a current path indicated in heavy lines which extends from the first power supply through current limiting resistor 59, conductor 65, relay contacts 20–1 and 21–1, selector switch 25, and conductor 66 across terminals C and D of the gun control cable connector and thence by way of selector switch 26 and conductor 67 to the opposite side of the first power supply. Terminals C and D lead by way of control cable conductors 75 and 76 respectively to the gun solenoid 41 which, for purposes of illustration, has also been shown in circuit in broken lines.

Whenever the foregoing circuit is completed, the higher voltage source will be applied across the gun solenoid. This voltage is of sufficient magnitude to cause complete retraction of the stud 37 from the workpiece 38.

Upon the energization of the relay 20, relay contacts 20–2 also simultaneously open and remove relay 21 out of circuit with the second power supply. However, relay 21 does not immediately de-energize due to the presence of a capacitor 68 in parallel with the relay 21.

Before opening of contacts 20–2, capacitor 68 charges to a predetermined value as fixed by the position of the contact 69 of potentiometer 70. Upon opening of the contacts 20–2, the capacitor 68 will discharge through the relay 21 and maintain the relay energized for a time dependent upon the initial charge on capacitor 68.

Accordingly, after a predetermined time following opening of contacts 20–2, relay 21 will become de-energized and open relay contacts 21–1 which then break the circuit through the gun solenoid resulting in the plunge of the stud toward the workpiece.

A further function of the relay 20 upon energization is to close relay contacts 20–3 to complete a circuit from the second power supply through relay 22. Relay 22, when energized, switches the main welding contacts 22–1 from their charging position, as shown, to a discharging position in which the capacitor 14 will discharge across the stud and workpiece by way of the main welding arc conductors 72, 45 and 46.

The main welding contact 22–1 have a fixed inertia which causes a finite delay in the time after initiation of the welding cycle before the welding contacts close. This delay is sufficient to permit the pilot arc to be struck and exist for a brief period before the main welding arc is superimposed upon the pilot arc. Also, the timing of the de-energization of the relay 21, as determined by the charge of capacitor 68 and potentiometer 70, is such that the relay contacts 21–1 will open and cause the stud to begin its plunge toward the workpiece at essentially the same time the welding contactor closes. In a given case, this may preferably be before the initiation of the plunge of the stud or slightly thereafter.

The heating and melting of portions of the stud and workpiece followed by the plunge of the stud into contact with the workpiece will result in their becoming welded together and, as well, marks the end of the welding cycle.

Relay contacts 21–1 include both a capacitor 73 and a thyrector diode 74, in parallel with the relay contacts to suppress and prevent arcing across the points due to the inductance of the gun solenoid upon breaking of the gun solenoid circuit. In a like manner, relay contacts 20–3 utilize a capacitor 77 and a thyrector diode 78 in parallel with the contacts to protect them from the inductance of the main welding contactor relay 22.

A resistor 85 and capacitor 86 in parallel with relay 20 provide protection for relay contacts 20–1 by delaying the opening of contacts 20–1 until contacts 21–1 have opened during a situation in which the control circuit through relay 20 is prematurely broken following initiation of the weld cycle. With the delay, the inductance from the gun solenoid 41 will always be suppressed by diode 74 and capacitor 73 and never allowed to arc across contacts 20–1. The delay is effected by capacitor 73 discharging back through relay 20 to maintain it energized following interruption of the current through relay 20.

(C) The initial gap mode

In the initial gap mode of operation, the stud is held in retracted position before initiation of the welding cycle. Upon initiation of the welding cycle, the main welding contactor is closed and the stud plunged toward the workpiece to initiate the main welding arc on contact of the stud with the workpiece.

Figure 3:
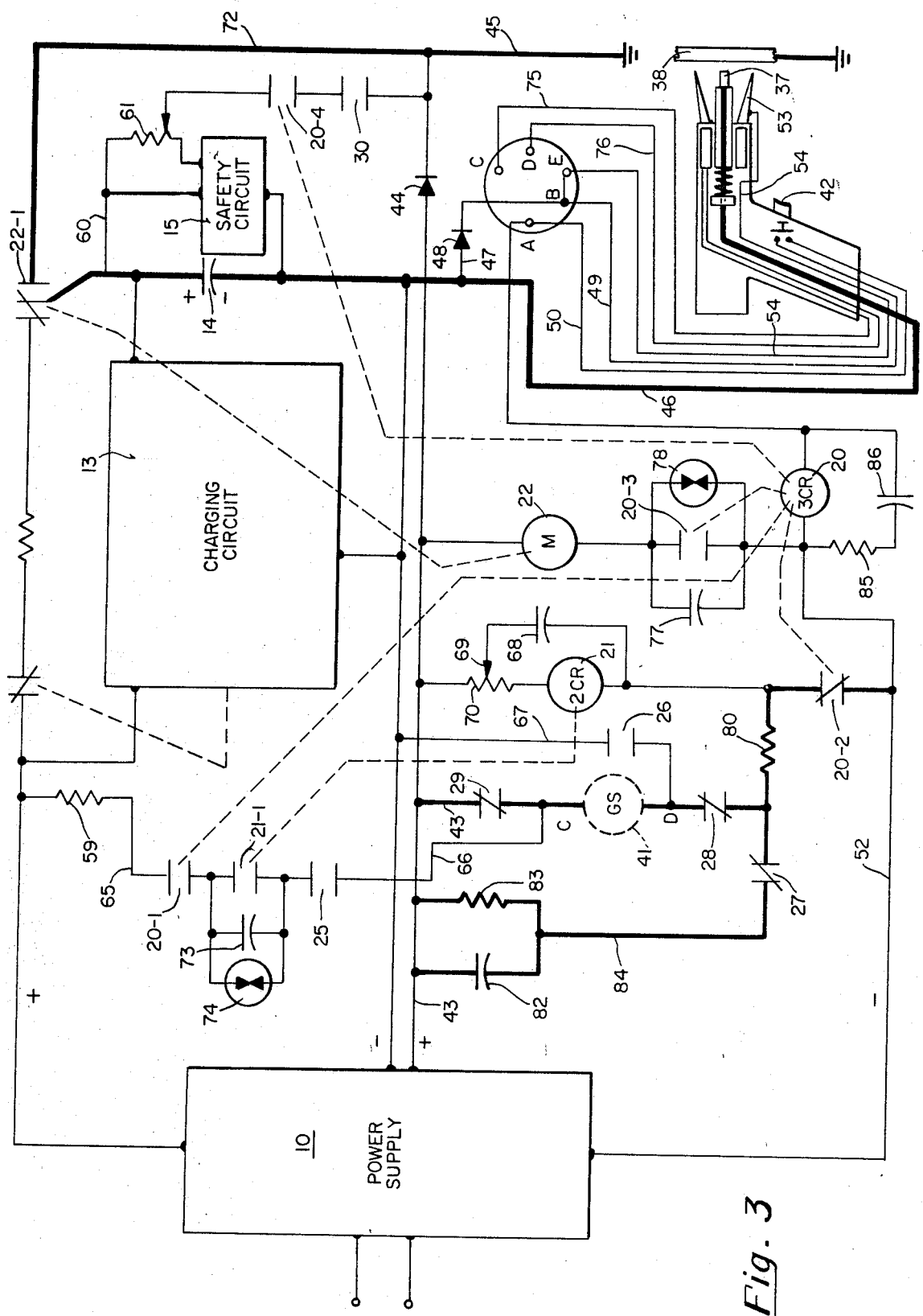
FIG. 3 is a wiring schematic of the present invention showing the circuitry selectively placed in the inital gap mode.

The welding apparatus of the present invention carries out this function, as may be seen in FIG. 3, whenever switches 27, 28 and 29 are closed and switches 25, 26 and 30 opened, thus placing the gun solenoid in circuit with the lower voltage power source. The resultant current flow through the gun solenoid in the initial gap mode of operation is illustrated in heavy lines.

Before the welding cycle is initiated, a current flow path is established through conductor 43, closed switch 29, the gun solenoid 41 and thence by way of closed switch 28, current limiting resistor 80 and the normally closed relay contact 20–2 to conductor 52 and the power source. The voltage of the second power source across which the gun solenoid is placed in circuit and the value of resistor 80 are such that the voltage impressed across the gun solenoid will not be sufficient to cause retraction of the stud but will be sufficient to hold the stud in retracted position when manually placed in that position.

The operator, upon placing the stud in the chuck 36, will push inwardly on the chuck and cause the stud to assume a retracted position. The welding gun will then be placed in position on the workpiece with the legs 53 thereof in electrical contact with the workpiece 38 while the stud is held in its retracted position.

As in the case of the drawn arc mode of operation, upon closing the gun trigger 42, a circuit will be established from the second power source through the workpiece 38 and leg 53 of the welding gun to energize the relay 20. The alternate circuit through the workpiece and the stud will not be effective in this mode of operation inasmuch as the stud is in its retracted position upon initiation of the welding cycle.

Relay 20 will then be energized and relay contacts 20–2 opened to thus remove the gun solenoid 41 out of circuit with the second power source.

Simultaneously with the opening of relay contacts 20–2, relay contacts 20–3 close and energize the main contactor relay 22 which will move the main welding contacts 22–1 to their discharge position. Nevertheless, due to the inherent inertia of the necessarily heavy relay contacts 22–1, closing of these contacts will not be instantaneous.

In the initial gap mode of operation, it is necessary that the main welding contacts be closed before the stud reaches the workpiece. Accordingly, due to the inherent inertia of the main welding contacts 22–1, a delay must be built into the de-energization of the gun solenoid 41 which will delay the plunge of the stud sufficiently to allow the main contactor to close before the study strikes the workpiece. This is accomplished by means of a capacitor 82 placed in parallel with the gun solenoid 41. This capacitor 82 is charged to a predetermined value before opening of contacts 20–2 and, upon opening of those contacts, will then discharge through the gun solenoid through switch means 29, 28, 27 and conductor 84 to delay the de-energization of the gun solenoid.

The value of the predetermined charge on the capacitor 82 is fixed by means of the voltage drop across resistor 83 placed in parallel with the capacitor 82 which voltage drop is, in turn, determined by the relative resistances of the gun solenoid 41 and resistors 80 and 83 all of which create a voltage divider across the second power source. Resistor 83 also serves the function of discharging capacitor 82 whenever the welding apparatus is shut off.

Thus, due to the built-in delay in the de-energization of gun solenoid 41, the main welding contacts 22–1 will close before the stud contacts the workpiece. Depending on the application, the timing of the de-energization of the gun solenoid 41 may be so designed that the main welding contacts are fully closed either before or after the gun solenoid becomes de-energized and the plunge of the stud initiated.

During this sequence of events, relay 20 closes relay contacts 20–1 and 20–4 and likewise relay 21 operates relay contacts 21–1. However, inasmuch as switches 25, 26 and 30 are open, the closing of these contacts is ineffective in this mode of operation.

(D) The initial contact mode

Figure 4:
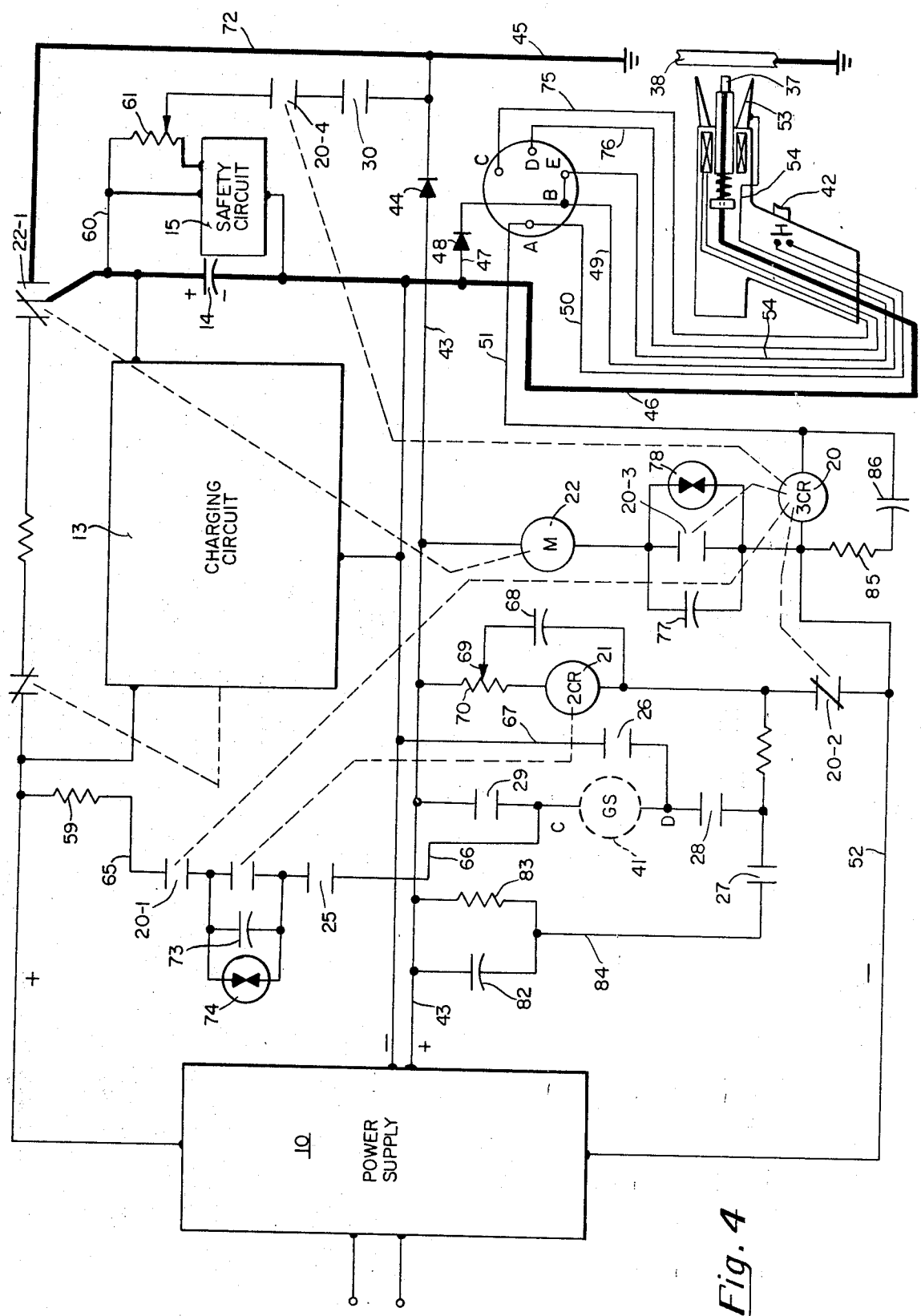
FIG. 4 is a wiring schematic of the present invention showing the circuitry selectively placed in the inital contact mode.

In the initial contact mode of operation, the stud to be welded is spring biased into contact with the workpiece and the main welding current discharged through the stud to melt the contiguous portions of the stud and workpiece to form the weld. This function is accomplished in the welding apparatus of the present invention by opening all of switches 25–30, as shown in FIG. 4, which represents the relative positions of the switches and relays of the present invention when selectively disposed in the initial contact mode.

Inasmuch as switches 25–30 are open, the gun solenoid 41 is removed from circuit with either the first power source or the second power source. The welding cycle is initiated by closing trigger 42 and, as in the drawn arc mode of operation, a circuit is completed through either the workpiece and leg 53 of the welding gun or workpiece 38 and stud 37 to energize relay 20. Upon energization of relay 20, relay contacts 20–1 through 20–4 operate as in the other two modes of operation. However, due to the open position of switches 25–30, the only relay contacts which are effective at this time are contacts 20–3. Upon closing of relay contacts 20–3, relay 22 is energized and closes the main welding contacts 22–1 to discharge capacitor 14 across the stud 37 and workpiece 38 to effect the weld.

(E) The power supply

Returning now to FIG. 1, the power supply utilized in the apparatus of the present invention includes a transformer 90 which has a single primary 91 and two secondaries 92 and 93. The main power supply for the welding apparatus may be a 115 volt AC source.

An on-off switch 94 places the transformer in circuit with the commercial power supply through a fuse 95. A pilot light 96 indicates when the main on-off switch 94 is closed.

The secondary winding 92 of the transformer 90 is connected across a diode bridge 12, the output of which is connected by way of conductors 97 and 98 to capacitor 14 for recharging the capacitor as will be described in more detail hereinafter in connection with the charging circuit itself.

A thyrector diode 99 connected in parallel with the input to bridge 12 serves to filter high voltage transients from the system.

The remaining secondary winding 93 of transformer 90 provides the input to a second diode bridge 11. The output of diode bridge 11 provides the control voltage for the welding apparatus by means of conductors 43 and 52.

In a preferred embodiment, the peak output voltage of bridge 12 is 180 volts while the peak output of bridge 11 is designed to be 47 volts.

While a single phase 115 volt AC input to the system has been shown and described, it is anticipated that this input may, as well, be a three phase 230/460 volt input with the transformer arrangement appropriately designed to apply this input to the two diode bridges.

(F) The charging circuit

The charging circuit 13 shown enclosed in broken lines in FIG. 1 serves to maintain a predetermined charge on the welding capacitor 14 as well as to recharge the capacitor after each welding process. This charging circuit is essentially that disclosed in U.S. Pat. No. 3,315,062 to Peace issued Apr. 18, 1967.

The operation of the charging circuit will be understood by first assuming that the charge on welding capacitor 14 has reached the predetermined charge. The value of this charge will be sensed by a voltage divider comprising resistor 102 and potentiometers 103 and 104. Terminal 105 of potentiometer 103 applies a portion of this sensed voltage to the emitter junction of unijunction transistor 106 and also permits a charge to build up upon capacitor 107.

A resistor 110, Zener diode 111 and capacitor 112 supply a regulated and filtered DC voltage across the two base junctions of the unijunction transistor 106 which maintains the two base junctions at a constant potential. As the charge builds up on capacitor 107, a voltage will be reached that will equal the firing point of unijunction transistor 106. Upon this firing voltage being reached, unijunction transistor 106 will conduct, and capacitor 107 will be discharged through the unijunction transistor and produce a pulse across resistor 113.

This pulse will be sensed across the gate 114 and cathode 115 of a silicon controlled rectifier 116 and will be of such polarity that silicon controlled rectifier 116 will be rendered conductive.

Whenever silicon controlled rectifier 116 is rendered conductive, a circuit is completed through relay 100 and current limiting resistor 117 and energizes the control relay which opens normally closed relay contacts 100–1. When contacts 100–1 open, the charging circuit from diode bridge 12 through current limiting resistor 101 is broken and the charging of capacitor 14 discontinued.

The value of capacitor 107 is such that it will quickly discharge through the unijunction transistor 106 and resistor 113. Upon reaching a predetermined discharge value for capacitor 107, the unijunction transistor will cut off and the capacitor 107 will again be recharged to the voltage level at which unijunction transistor 106 will again conduct. This pulsing effect will occur many times during a given half cycle of output from the rectifier bridge 12.

Although the silicon control rectifier 116 will remain conducting upon the receipt of the initial pulse so long as a positive bias is maintained across its anode to cathode junction, at the end of each half cycle of output of the bridge 12, the voltage across the silicon controlled rectifier 116 will fall to a point that shuts off the silicon controlled rectifier 116. Nevertheless, rectifier 116 is again rendered conductive during the next half cycle by the continuous pulsing occurring through unijunction transistor 106.

A capacitor 118 placed in parallel with the control relay 100 maintains the control relay energized between each half cycle of output of the rectifier 112.

If the welding capacitor 106 is discharged through a welding cycle or the charge thereon decays slightly, this voltage drop will be sensed across the voltage divider and unijunction transistor 106 will stop pulsing and, in turn, silicon controlled rectifier 116 will be cut off. Upon silicon controlled rectifier 116 cutting off, the charge on capacitor 118 will be bled off in a relatively few output cycles from bridge 12, and eventually, control relay 100 will become de-energized closing contacts 100–1 to again place the welding capacitor in circuit with the output of diode bridge 12 to recharge the capacitor.

Potentiometer 104 adjusts the maximum voltage to which the welding capacitor 14 may be charged and potentiometer 103 allows a selection of any voltage to which the welding capacitor 14 may be charged up to the maximum voltage.

Capacitor 119 placed in parallel with silicon controlled rectifier 116 will charge to a predetermined value whenever silicon controlled rectifier 116 is rendered nonconductive. Upon receipt of the pulse from unijunction transistor 106, the capacitor 119 will discharge through the silicon controlled rectifier 116 and aid in rendering the silicon controlled rectifier conductive. Also, capacitor 119 prevents the premature conducting of rectifier 116 if contacts 100-1 are closed when the charge on capacitor 14 is near its set value.

Resistor 120 which is in circuit with one of the bases of the unijunction transistor 106 limits current through that base leg and also compensates for temperature effects in the unijunction transistor.

(G) The safety circuit

The welding apparatus of the present invention also employs a safety circuit 15 shown in FIG. 1 which serves to discharge the main welding capacitor 14 whenever the welding apparatus is turned off. The safety circuit employs a switch 121 which is physically connected with the on-off switch 94 such that when switch 94 is opened, switch 121 will be closed. Upon closing of switch 121, capacitor 14 is shunted through resistor 61 and switch 121. Diode 122 serves to protect against reverse charging of capacitor 14. After a given interval of time, the charge on capacitor 14 will be bled off through the resistor 61. A volt meter 123 serves to indicate the charge on capacitor 14.

The illustrated and described embodiment of the welding apparatus of the present invention constitutes a new and novel circuit arrangement by means of which welding may be selectively done in either the drawn arc, initial gap, or initial contact modes of operation. Changes may be made in the described embodiment without departing from the scope and spirit of the invention here involved, it being intended that all matter contained in the above description and shown in the accompanying drawings shall be interpreted as illustrative and not limiting.

What is claimed is:

1. Welding apparatus selectively operable in the drawn arc, initial gap and initial contact mode comprising:
   means including a solenoid for positioning a stud with respect to a workpiece,
   a power source,
   first circuit means connected to said power source for applying a first voltage across said solenoid of value sufficient to cause retraction of said stud,
   second circuit means connected to said power source for applying a voltage across said solenoid of value insufficient to cause retraction of said stud but of value sufficient to hold said stud when manually retracted,
   first switching means for selectively opening either or both said first and said second circuit means,
   second switching means actuated upon initiation of the welding cycle for simultaneously closing said first circuit means and opening said second circuit means, and
   third switching means controlled by actuation of said second switching means for opening said first circuit means after initiation of the welding cycle.

2. The welding apparatus of claim 1 in which said first switching means closes said first circuit means and opens said second circuit means when in the drawn arc mode, opens said first circuit means and closes said second circuit means when in the initial gap mode and opens both said first circuit means and said second circuit means when in the initial contact mode of operation.

3. The welding apparatus of claim 1 in which said power source includes:
   a primary winding,
   a first secondary winding connected in circuit with said first circuit means and providing the welding energy for the welding process, and
   a second secondary winding connected in circuit with said second circuit means and of lower voltage than said first secondary winding.

4. The welding apparatus of claim 1 further including capacitive means connected in parallel with said solenoid and charged upon closing of said second circuit means to maintain said solenoid energized a predetermined period after said second circuit means is opened during operation of said welding apparatus in the initial gap mode.

5. The welding apparatus of claim 1 further including capacitive means in parallel with said third switching means for delaying actuation of said third switching means and opening of said first circuit means a predetermined time after actuation of said second switching means.

6. The welding apparatus of claim 1 further including:
   third circuit means connecting said stud and said workpiece in circuit with said power source and including means restricting the energy discharge of said power source, a portion of said third circuit means being closed by said first switching means upon closing of said first circuit means and the remainder of said third circuit means being closed by said second switching means upon initiation of the welding cycle.

7. The welding apparatus of claim 1 in which said second switching means controls the initiation of welding current in the weld cycle.

8. The welding apparatus of claim 1 in which said power source charges a capacitor which provides the welding current for the welding process.

9. Welding apparatus selectively operable in the drawn arc, initial gap and initial contact modes comprising:
   stud holding means movable between retracted and unretracted positions for holding and positioning a stud with respect to a workpiece,
   biasing means for biasing said stud holding means in unretracted position,
   solenoid means for retracting and holding said stud holding means in retracted position, said solenoid means being responsive to a first voltage to effect retraction of said stud holding means against said biasing means and responsive to a second and lower voltage for maintaining said stud holding means in retracted position against said biasing means after being manually retracted,
   a first power source providing said first voltage,
   a second power source providing said second voltage, and
   switching means for selectively placing said solenoid means in circuit with the first power source to retract said stud when in the drawn arc mode, to place said solenoid means in circuit with said second power source to hold said stud in position when manually retracted when in the initial contact mode and to isolate said solenoid means from said first and said second power sources when in the initial contact mode.

10. Welding apparatus comprising:
    a welding gun having a leg portion for supporting the gun above the workpiece and means for retaining a stud,
    a first power source providing the welding energy for the welding process,
    first circuit means connecting said first power source in circuit with said stud and workpiece,
    a second power source of lower voltage than said first power source,
    control means for initiating the welding cycle,
    second circuit means connected through said control means, said first circuit means, said workpiece and said stud,
    third circuit means connected through said control means, said first circuit means, said workpiece and said leg portion of said welding gun,
    manually operable means closing said second circuit means and said third circuit means to energize said control means and initiate the welding cycle, and fourth circuit means isolating current flow in said first circuit means from said second and said third circuit means.

11. Apparatus for welding studs comprising:

a welding gun having a leg portion for supporting the gun above a workpiece and means for holding a stud, means to position the stud at predetermined positions with respect to the workpiece at predetermined times in the weld cycle, a capacitor, first energy discharge circuit means connecting said stud and said workpiece in circuit with said capacitor and including means restricting the energy discharge of said capacitor to establish a pilot arc between said stud and said workpiece, a first power source, second circuit means connecting said capacitor in circuit with said power source for charging said capacitor, third energy discharge circuit means connecting said capacitor in circuit with said stud and said workpiece to establish an arc of welding intensity therebetween, a power source of lower voltage than said first power source, fourth circuit means completing a circuit from said low voltage source through either or both said workpiece and said stud or said workpiece and said leg portion of said welding gun, and control means energized by closing of said fourth circuit means for closing said first and third energy discharge circuit means.

12. The apparatus of claim 11 in which said means for positioning a stud with respect to the workpiece includes:

first circuit means to cause said stud to be retracted and thereafter returned to the workpiece at predetermined times in the weld cycle, second circuit means to cause said stud to hold in the retracted position before initiation of the weld cycle and thereafter return the stud to the workpiece after a predetermined time, third circuit means for causing said stud to remain in contact with the workpiece during the welding cycle, and circuit selector means to selectively render operable either said first, said second or said third circuit means while simultaneously rendering the remaining circuits inoperable during a given weld cycle.

13. Welding apparatus comprising:

a welding gun having stud holding means movable between a retracted and an unretracted position, means biasing said stud holding means to its unretracted position, electrically operated means for retracting and maintaining said stud holding means in said retracted position, a power source, first circuit means connected in circuit with said power source to sequentially energize and then de-energize said electrically operated means upon initiation of the welding current for sequential retraction and return of said stud holding means from its unretracted position, second circuit means connected in circuit with said power source and with said electrically operated means for energizing said electrically operated means to maintain said stud holding means in its retracted position before initiation of the welding current and to thereafter de-energize said electrically operated means substantially simultaneously with the initiation of the welding current to return said stud to its unretracted position, and switching means included in said first and said second circuit means for rendering either or both said first and second circuit means inoperative whereby said welding gun may be utilized in the drawn arc mode, initial gap mode or initial contact mode.

14. The welding apparatus of claim 13 in which said first circuit means imposes a higher voltage on said electrically operated means during retraction of said stud than said second circuit means imposes on said electrically operated means when holding said stud in retracted position.

15. The welding apparatus of claim 13 in which said first circuit means includes circuitry for closing said first circuit means upon initiation of the welding cycle to energize said electrically operated means to retract said stud and further including:

circuitry to reopen said first circuit means after closing thereof to de-energize said electrically operated means for returning said stud to its unretracted position whenever said switching means renders said welding apparatus operable in the drawn arc mode.

16. The welding apparatus of claim 13 in which said second circuit means further includes means for opening said second circuit means substantially simultaneously with the initiation of said welding current and capacitive means in parallel with said electrically operated means to maintain said electrically operated means energized for a predetermined time after opening of said second circuit means to define the time within the weld cycle at which the stud is returned to its unretracted position whenever said switching means renders said welding apparatus operable in the initial gap mode.

17. Welding apparatus employing circuitry operable in the drawn arc, initial gap and initial contact mode comprising:

a welding gun having a leg portion to support said gun with respect to a workpiece and means including a solenoid for positioning a stud in respect to said workpiece, a first power source, a capacitor, first circuit means connecting said capacitor in circuit with said first power source for charging of said capacitor, second circuit means connecting said stud and workpiece in circuit with said capacitor and including current limiting means to establish a pilot arc, third circuit means connecting the stud and workpiece in circuit with said capacitor to establish a welding arc, fourth circuit means connecting said solenoid in circuit with said first power source, a second power source, fifth circuit means connecting said second power source in circuit with said solenoid, first switching means for rendering inoperable said second and said fourth circuit means jointly or said fifth circuit means individually or said second, fourth and fifth circuit means jointly, second switching means actuated upon initiation of the welding cycle for simultaneously closing said fourth circuit means and opening said fifth circuit means, and third switching means controlled by actuation of said second switching means for opening said fourth circuit means a predetermined time after initiation of the welding cycle.

18. The welding apparatus of claim 17 in which said second switching means is actuated through a circuit including said second power source, a portion of said first and said second circuit means, said workpiece, and through either or both said stud and said leg portion of the welding gun.

References Cited

UNITED STATES PATENTS 3,319,039    5/1967    Glorioso _____ 219—98

RALPH F. STAUBLY, Primary Examiner

M. C. FLIESER, Assistant Examiner